3,594,264
ULTRAVIOLET LIGHT STABILIZED POLYCARBONATE ARTICLE
Raymond C. Urban, Pittsfield, Mass., assignor to General Electric Company
No Drawing. Filed Oct. 28, 1968, Ser. No. 771,336
Int. Cl. B32b 27/18, 27/30
U.S. Cl. 161—165                                                6 Claims

ABSTRACT OF THE DISCLOSURE

An ultraviolet light resistant polycarbonate article consisting of a polycarbonate substrate having bonded to at least one surface thereof an acrylate copolymer film of 1 to 10 mils thickness wherein the acrylate copolymer film has uniformly dispersed throughout 0.25–5.0 weight percent of an ultraviolet light absorbent based on the weight of the acrylate copolymer film. The ultraviolet light absorbent may be any of the known ultraviolet light absorbents. The article is particularly resistant to ultraviolet light and protects the polycarbonate from attack from ultraviolet light. In addition, a process is also disclosed for preparing an ultraviolet light resistant polycarbonate article, which process consists of bringing an acrylate copolymer film into contact with a polycarbonate sheet at elevated temperatures and at a pressure of at least 20 p.s.i. and then cooling the article to room temperature.

---

This invention is directed to an aromatic carbonate polymer article wherein the article consists of an aromatic carbonate polymer substrate having bonded to at least one surface thereof an acrylate copolymer film. The acrylate copolymer film contains uniformly dispersed throughout an ultraviolet light absorbent.

Ultraviolet light stabilization is well known in the polymer art wherein many polymers employ an ultraviolet light absorbent for purposes of rendering the polymer article resistant to degradation by ultraviolet light. Many ways have been devised in which to incorporate an ultraviolet light absorbent with a particular polymer. One such way is to incorporate the absorbent in the polymer melt prior to forming the structure therefrom. U.S. Pat. 3,043,709 describes another way which is coating the surface of the polymer substrate with an absorbent and then heating the structure to a temperature above the melting point of the absorbent but below the melting point of the polymer structure. As it is processed, the absorbent penetrates into the surface of the polymer substrate. Unfortunately, the heat treating step while in essence drives the absorbent into the surface of the polymer can also result in degradation or in discoloration of the polymer.

Therefore, it is an object of this invention to provide an ultraviolet light resistant aromatic carbonate polymer article.

Another object of this invention is to provide a clear transparent aromatic carbonate polymer article.

Yet another object of this invention is to provide an aromatic carbonate polymer article having bonded to at least one surface thereof an acrylate copolymer film containing an ultraviolet light absorbent.

Still another object of this invention is to provide a process for preparing an ultraviolet light resistant aromatic carbonate polymer article.

Other objects and advantages of this invention will become apparent from the following detailed description thereof.

Briefly, according to this invention, the foregoing and other objects are attained by bonding to at least one surface of an aromatic carbonate polymer substrate an acrylate copolymer film of 1 to 10 mils thickness wherein the film contains uniformly dispersed throughout 0.25–5 weight percent of an ultraviolet light absorbent based on the weight of the acrylate copolymer film. The article is resistant to degradation by ultraviolet light.

The following examples are set forth to illustrate more clearly the principle and practice of this invention to those skilled in the art. Unless otherwise expressed, where parts are mentioned, they are parts by weight.

EXAMPLE I

Clear transparent laminates are prepared employing polycarbonate sheets separately having bonded to one surface thereof a 3-mil thick film of a methyl methacrylate-ethyl acrylate copolymer. The polycarbonate used herein is a polycarbonate prepared from 2,2-bis(4-hydroxyphenyl)-propane and phosgene and having an intrinsic viscosity of about 0.52 as measured in dioxane at 30° C. The polycarbonate sheets are about ⅛" thick and some contain no ultraviolet light absorbent while others employed herein contain 0.5 weight percent of the ultraviolet light absorbent 2(2'-hydroxy - 5' - methylphenyl) benzotriazole based on the weight of the polycarbonate sheet. The methyl methacrylate-ethyl acrylate copolymer film also contains 0.5 weight percent of the ultraviolet light absorbent, 2-hydroxy - 4 - methoxy benzophenone. The laminates which are 2" x 2" square are prepared by pressing a polycarbonate sheet and acrylate copolymer film together at about 325° F. and about 500 p.s.i. for about 3 minutes. The samples are cooled in the press while under pressure to room temperature. Some of the laminates are prepared with the polycarbonate sheet containing no ultraviolet light absorbent and others are prepared with the polycarbonate sheet containing the above-identified ultraviolet light absorbent.

The test samples are exposed to six 275-watt R–S sunlamps (General Electric) at 6" distance on a rotating turntable with the acrylate side of the laminate exposed to the sunlamps. The temperature is maintained at 50° C. or less. The samples are tested for yellowness in accordance with the provisions of ASTM 1925–63T Yellowness Index Test. Polycarbonate sheets without the acrylate film laminated thereto are used as a control with average results as follows:

TABLE 1

| Sample | Yellowness index | | | |
|---|---|---|---|---|
| | 0 week | 5 weeks | 10 weeks | 15 weeks |
| 1. Polycarbonate sheet | 2.7 | 23.5 | 26.5 | 27.5 |
| 2. Polycarbonate sheet with 2(2'-hydroxy-5'methylphenyl) benzotriazole | 4.5 | 10.1 | 12.1 | 14.4 |
| 3. Laminate of 1 above with the acrylate copolymer film | 4.9 | 7.3 | 10.1 | 15.2 |
| 4. Laminate of 2 above with the acrylate copolymer film | 6.5 | 5.3 | 5.9 | 7.1 |

EXAMPLE II

Example I above is repeated but the laminates are prepared with a methylmethacrylate polymer film of 4 mils thickness. The average results are as follows:

TABLE 2

| Sample | Yellowness index | | | |
|---|---|---|---|---|
| | 0 week | 5 weeks | 10 weeks | 15 weeks |
| 1. 1 of Table 1 with acrylate copolymer film | 2.6 | 2.9 | 4.8 | 6.6 |
| 2. 2 of Table 1 with acrylate copolymer film | 6.2 | 8.1 | 12.3 | 11.5 |

EXAMPLE III

Laminates are prepared as in Example I but with various thicknesses of the acrylate film so employed in Example I.

The samples are exposed to fluorescent sunlamp/blacklight tester designed by American Cyanamid Company and tested for yellowness in accordance with ASTM Yellowness Index Test D1925–63T. This tester consists of ten 20-watt fluorescent sunlamp tubes and ten 20-watt fluorescent blacklight tubes mounted alternately in the center of a rotating steel drum. The samples are exposed 3″ from the light and are rotated continuously during the course of exposure. The average results are as follows:

TABLE 3

| Sample | Yellowness index | | | |
|---|---|---|---|---|
| | 0 week | 5 weeks | 10 weeks | 15 weeks |
| 1. Polycarbonate sheet | 2.5 | 18.3 | 20.8 | 22.5 |
| 2. Polycarbonate sheet with 2(2'-hydroxy-5'-methylphenyl) benzotriazole | 2.6 | 9.6 | 11.4 | 12.0 |
| 3. Laminate of 1 above with 3-mil acrylate copolymer film | 5.1 | 6.6 | 8.5 | 9.7 |
| 4. Laminate of 2 above with: | | | | |
| 2-mil acrylate copolymer film | 5.9 | 6.0 | 5.5 | 6.0 |
| 3-mil acrylate copolymer film | 6.1 | 5.0 | 5.0 | 5.7 |

EXAMPLE IV

Laminates are prepared as in Example II with various thicknesses of the acrylate sheet so employed in Example II. The samples are exposed to the same conditions as in Example III. The results are as follows:

TABLE 4

| Sample | Yellowness index | | | |
|---|---|---|---|---|
| | 0 week | 5 weeks | 10 weeks | 15 weeks |
| 1. Polycarbonate sheet | 2.5 | 18.3 | 20.8 | 22.5 |
| 2. Laminate of 1 above with: | | | | |
| 2-mil acrylate copolymer film | 3.1 | 3.3 | 4.5 | 5.0 |
| 3-mil acrylate copolymer film | 3.1 | 3.3 | 4.4 | 5.5 |
| 6-mil acrylate copolymer film | 3.3 | 3.4 | 3.6 | 4.0 |

EXAMPLE V

A laminate is prepared employing the polycarbonate sheet of Example I containing no ultraviolet light absorbent and a polymethylmethacrylate sheet also containing no ultraviolet light absorbent. The laminate is prepared in the same manner as in Example I and tested for Yellowness Index employing the same test conditions set forth in Example I. The results are as follows:

TABLE 5

Yellowness index

Weeks:
0 _____ 2.7
15.8 _____ 15.8
10 _____ 21.0
15 _____ 26.3

This invention is directed to an ultraviolet light resistant aromatic carbonate polymer article wherein the article consists of an acrylate copolymer film bonded to at least one surface of an aromatic carbonate polymer substrate. The acrylate copolymer film may have a thickness of from 1 to about 10 mils and contains uniformly dispersed throughout 0.25–5.0 weight percent of an ultraviolet light absorbent. The acrylate copolymer film protects the aromatic carbonate polymer substrate from degradation and discoloration by ultraviolet light. In addition, the article does not delaminate upon exposure to ultraviolet light. Further, this invention is also directed to a process for preparing the article wherein an acrylate copolymer film and an aromatic carbonate polymer sheet are bonded together under the conditions of heat and pressure to form a laminate. By this process, excellent bonding of the acrylate copolymer film to the aromatic carbonate polymer substrate is obtained. In addition, it is interesting to note that an aromatic carbonate polymer alone such as a polycarbonate sheet disclosed in the examples is readily degraded by ultraviolet light even though it may contain an ultraviolet light absorbent. In two weeks upon exposure to either the R–S sunlamps or the fluorescent sunlamp/blacklight tester, the surface of the polycarbonate sheet becomes rough and there is complete loss of gloss and an increase in haze compared to the polycarbonate sheet before exposure to ultraviolet light. This clearly shows the severe degradation of the surface of a polycarbonate sheet due to ultraviolet light. Clearly as shown in the examples, a polycarbonate substrate having laminated thereto an acrylate copolymer film does not suffer from the effects of ultraviolet light.

The acrylate copolymer film employed in the practice of this invention can be any of the acrylate copolymers. These include copolymers of acrylic acid, esters of acrylic acid with alcohols containing 1–18 carbon atoms, substituted acrylic acids such as methacrylic acid, esters of substituted acrylic acids with alcohols containing 1–18 carbon atoms and acrylonitrile, and mixtures thereof. The acrylate copolymers may contain greater than 50 weight percent of acrylic acid or substituted acrylic acid esters and preferably greater than 90 weight percent thereof. The acrylate copolymer films are generally prepared by extruding the acrylate copolymer in an extruder at a temperature of about 325° F. through a sheet die or film die orifice. The acrylate copolymer films employed herein have a thickness of 1–10 mils and contain uniformly dispersed throughout an ultraviolet light absorbent. The ultraviolet light absorbent may be added either as a blend with the acrylate copolymer or it may be fed to the feed hopper of an extruder separately with the acrylate polymer.

The process for preparing the aromatic carbonate polymer article of this invention comprises bonding an acrylate copolymer film to an aromatic carbonate polymer substrate under the conditions of elevated temperatures and pressures. The acrylate copolymer film and the aromatic carbonate polymer sheet may be assembled in a press equipped with heated platens and laminated under heat and pressure. Alternatively, the acrylate copolymer film may be bonded to the carbonate copolymer sheet by contacting the film and carbonate polymer sheet through the nip of a pair of rolls, which rolls may be heated. The carbonate copolymer substrate may have the acrylate polymer film bonded to one or both surfaces thereof. For purposes of efficient bonding, the temperature employed should be at least 325° F. and the pressure at least 20 p.s.i. gauge. Obviously, the higher the temperature, the shorter the period of time necessary to achieve bonding of the two polymers and the lower the pressure necessary for bonding. In addition, vacuum formed articles can be prepared by either vacuum forming the composite article or by bringing the acrylate copolymer film and carbonate polymer sheet together while vacuum forming. Generally, the carbonate polymer substrate may vary in thickness but is preferably at least 10 mils thick.

The ultraviolet light absorbent employed in the practice of this invention can be any of the known ultraviolet light absorbents. The ultraviolet light absorbents particularly useful in the practice of this invention are the benzophenones, substituted benzophenones and benzotriazoles such as set forth in U.S. Pats. 3,043,709; 3,049,443; and 3,309,220. In addition, mixtures of any of the ultraviolet light absorbents may also be employed herein. The preferred ultraviolet light absorbent employed in the practice of this invention is 2-hydroxy-4-methoxybenzophenone.

The aromatic carbonate polymer substrate employed herein is a polycarbonate material as described and disclosed in U.S. Pats. 3,028,365; 3,030,331 and 3,169,121. Such aromatic carbonate polymers are prepared by reacting a dihydric phenol with a carbonate precursor, which carbonate precursor may be either a carbonyl halide, a carbonate ester or a haloformate. The carbonyl halides may consist of carbonyl chloride, carbonyl bromide or carbonyl fluoride. Typical of the carbonate esters are diphenyl carbonate, di-(halophenyl) carbonates such as di- (chlorophenyl) carbonate, di-(bromophenyl) carbonate, di-(trichlorophenyl) carbonate, di-(tribromophenyl) carbonate, etc., di-(alkylphenyl) carbonates such as di-(tolyl) carbonate, etc., di-(naphthyl) carbonate, di-(chloronaphthyl) carbonate, phenyl tolyl carbonate, chlorophenyl chloronaphthyl carbonate, etc. or mixtures thereof. The haloformates may consist of bishaloformates of dihydroxy aromatic compounds (bischloroformates of hydroquinone, etc.) or glycols (bishaloformates of ethylene glycol, neopentyl glycol, propylene glycol, etc.) preferably phosgene is employed to prepare the aromatic carbonate polymers employed in the practice of this invention.

The dihydric phenols which can be employed to prepare the aromatic carbonate polymers employed herein are mononuclear or polynuclear aromatic compounds containing as functional groups two hydroxy radicals, each of which is attached directly to a carbon atom of an aromatic nucleus and are bisphenols such as 1,1-bis-(4-hydroxyphenyl)-methane, 2,2-bis-(4-hydroxyphenyl)propane, 2, 2-bis-(4-hydroxy-3-methylphenyl)-propane, 4,4 - bis-(4-hydroxyphenyl)-heptane, etc., dihydric phenol ethers such as bis-(4-hydroxyphenyl)-ether, bis-(3,5-dichloro-4-hydroxyphenyl)-ether, etc., dihydroxy diphenyls such as p,p'-dihydroxydiphenyl, 3,3' - dichloro-4,4'-dihydroxydiphenyl, etc., dihydroxyaryl sulfones such as bis(4-hydroxyphenyl)-sulfone, bis-(3,5 - dimethyl-4-hydroxyphenyl)-sulfone, bis-(3-methyl-5-ethyl-4-hydroxyphenyl)-sulfone, etc., dihydroxy benzenes, resorcinol, hydroquinone, halo- and alkyl-substituted dihydroxy benzenes such as 1,4-dihydroxy - 2 - chlorobenzene, 1,4-dihydroxy-2,3-dichlorobenzene, 1,4-dihydroxy-3-methylbenzene, etc., and dihydroxy diphenyl sulfoxides such as bis-(4-hydroxyphenyl)-sulfoxide, bis-(3,5-dibromo-4-hydroxyphenyl)-sulfoxide, etc. A variety of additional dihydric phenols are also available to provide carbonate polymers and are disclosed in U.S. Pats. 2,999,835; 3,038,365 and 3,153,008. It is, of course, possible to employ two or more different dihydric phenols or a copolymer of a dihydric phenol with glycol, and hydroxy or an acid terminated polyester, or a dibasic acid in the event a carbonate copolymer or interpolymer rather than a homopolymer is desired for use in the preparation of the aromatic carbonate polymers of this invention.

The reaction may be carried out in the presence of an acid acceptor and a molecular weight regulator. The acid acceptor may be either an organic or an inorganic compound. A suitable organic acid acceptor is a tertiary amine and includes such materials as pyridine, triethylamine, dimethylaniline, tributylamine, etc. The acid acceptor may be one which can be either an hydroxide, a carbonate, a bicarbonate or a phosphate of an alkali or alkaline earth metal. The molecular weight regulators which are employed in carrying out the process for preparing the aromatic polycarbonate resins can be such molecular weight regulators as phenol, cyclohexanol, methanol, paratertiary butylphenol, para-bromophenol, etc. Preferably, phenol may be employed as the molecular weight regulator.

The aromatic carbonate polymer article of this invention may be either a clear transparent article or a pigmented article. They may be used in the form of sheets for window glazing or in the preparation of signs. In addition, the article of this invention may be vacuum formed such as for preparing embossed or raised signs, letters, etc. Further, the article of this invention may also be prepared by injection molding the aromatic carbonate polymer against a film of the acrylate polymer wherein the two materials are simultaneously bonded and molded in one operation. The aromatic carbonate polymer article herein may have the acrylate copolymer film laminated to one or both sides of the carbonate polymer substrate. Naturally, the acrylate copolymer side of the article should be exposed to that side receiving the ultraviolet light waves.

The particular advantage of the instant invention is that the polyacrylate film can be ultraviolet light absorbent and protects the polycarbonate against attack or degradation by the ultraviolet light. In addition, by bonding in this manner as disclosed herein, the laminate is resistant to delamination and protects the polycarbonate from discoloration.

It will thus be seen that the objects set forth above among those made apparent from the preceding description are efficiently attained and since certain changes may be made in carrying out the above process, and in the composition set forth without departing from the scope of this invention, it is intended that all matters contained in the above description shall be interpreted as illustrative and not in a limiting sense.

What is claimed is:

1. An ultraviolet light resistant aromatic carbonate polymer article consisting of an aromatic carbonate polymer substrate having bonded to at least one surface thereof an acrylate copolymer film of 1–10 mils thickness; said acrylate copolymer film having uniformly dispersed throughout 0.25–5.0 weight percent of an ultraviolet light absorbent based on the weight of the acrylate copolymer film.

2. The article of claim 1 wherein the acrylate copolymer film is a methylmethacrylate-ethyl acrylate copolymer.

3. The article of claim 1 wherein the ultraviolet light absorbent is 2-hydroxy-4-methoxybenzophenone.

4. The article of claim 1 wherein the aromatic carbonate polymer substrate is a polymer of 2,2-bis-(4-hydroxyphenyl)-propane and phosgene.

5. The article of claim 1 wherein the article is a clear colorless transparent sheet.

6. The article of claim 1 wherein the carbonate polymer substrate has the acrylate copolymer film bonded to two surfaces of the carbonate polymer substrate.

References Cited

UNITED STATES PATENTS

| | | | |
|---|---|---|---|
| 3,359,153 | 12/1967 | Bean | 161—410X |
| 3,429,732 | 2/1969 | Baitinger | 161—1X |
| 2,774,697 | 12/1956 | Koblitz | 161—183 |
| 2,787,568 | 4/1957 | Koblitz | 161—183 |
| 3,113,907 | 12/1963 | Tocker | 161—165 |
| 3,309,220 | 3/1967 | Osteen | 117—33.3 |
| 3,320,116 | 5/1967 | Tocker | 161—252 |
| 3,388,034 | 6/1968 | McCombie | 161—183 |
| 3,388,035 | 6/1968 | Mattimoe et al. | 161—183 |
| 3,420,679 | 1/1969 | Gifford et al. | 161—183X |
| 3,447,997 | 6/1969 | Kamal | 161—165 |
| 3,457,104 | 7/1969 | Bristol | 161—183X |

HAROLD ANSHER, Primary Examiner

U.S. Cl. X.R.

161—1, 183, 252, 408, 410